Oct. 3, 1933.  H. R. GOTTHARDT ET AL  1,929,354
SWITCHING CONVEYER
Filed June 12, 1931  2 Sheets-Sheet 1
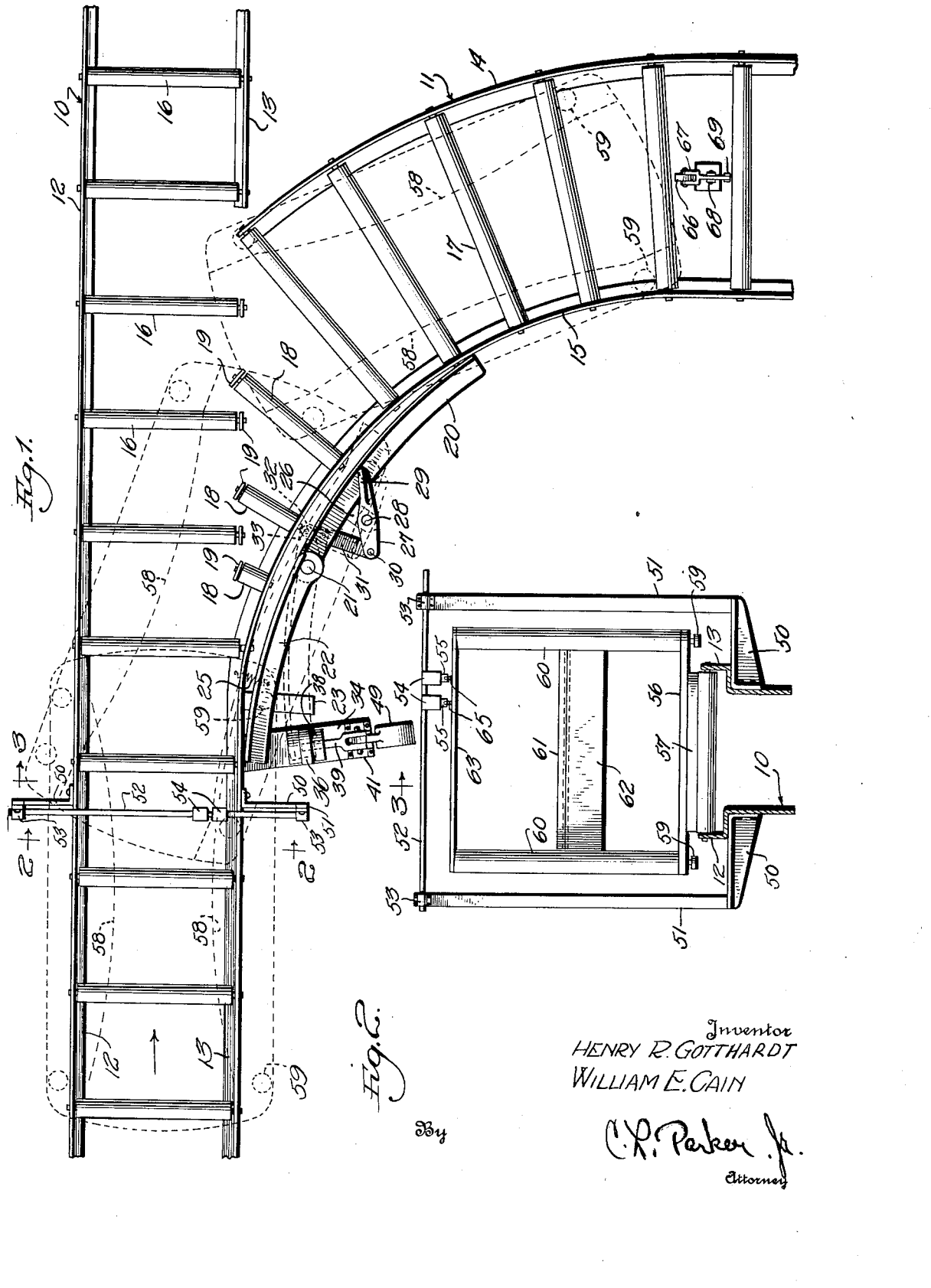
Inventor
HENRY R. GOTTHARDT
WILLIAM E. CAIN
By
C. L. Parker, Jr.
Attorney Oct. 3, 1933.  H. R. GOTTHARDT ET AL  1,929,354
SWITCHING CONVEYER
Filed June 12, 1931  2 Sheets-Sheet 2
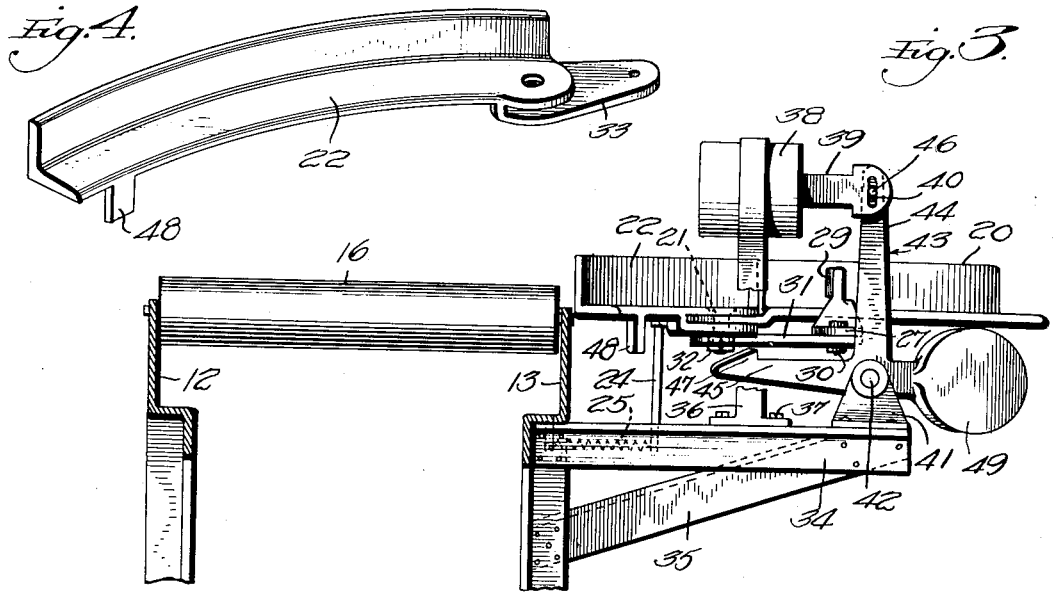
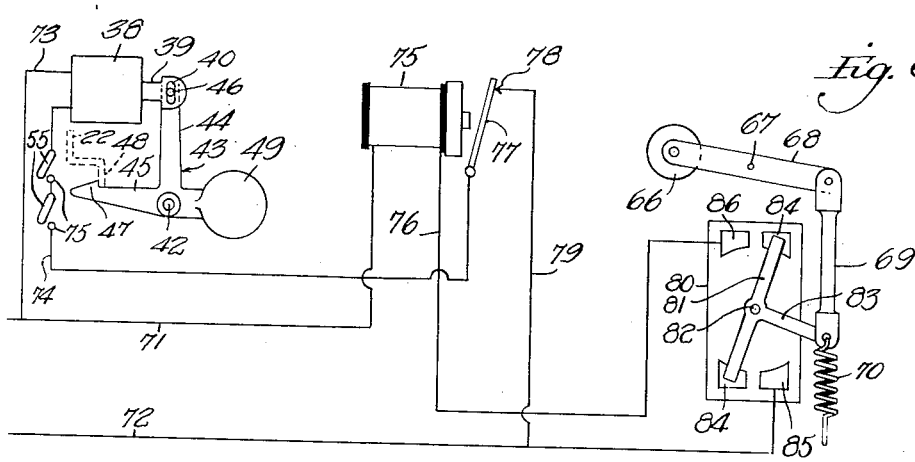
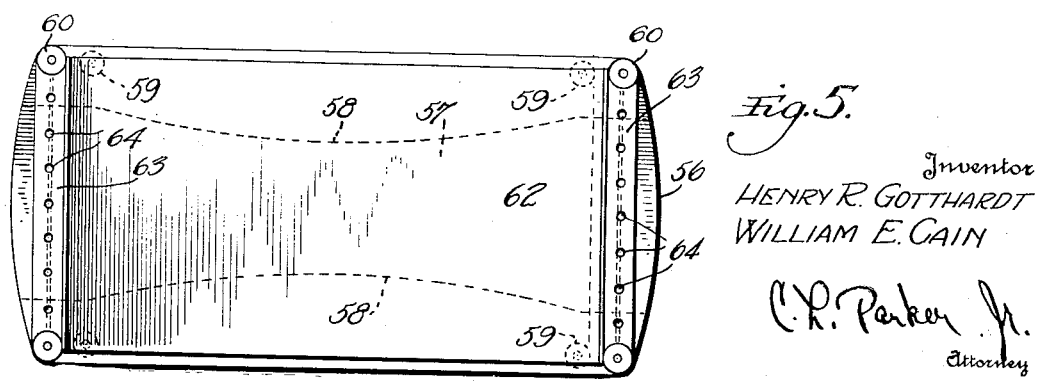
Inventor
HENRY R. GOTTHARDT
WILLIAM E. CAIN
C. L. Parker Jr.
Attorney Patented Oct. 3, 1933

1,929,354

UNITED STATES PATENT OFFICE 1,929,354

SWITCHING CONVEYER

Henry R. Gotthardt, Louisville, Ky., and William E. Cain, Jeffersonville, Ind., assignors to Logan Co., Inc., Louisville, Ky., a corporation of Kentucky Application June 12, 1931. Serial No. 543,946

14 Claims. (Cl. 198—38)

This invention relates to switching conveyers, and more particularly to a conveying system operable for switching articles or carriers from a main conveyer to either of a plurality of branch conveyers.

An important object of the invention is to provide a conveying system including a main conveyer, and one or more branch conveyers leading therefrom, and to provide means operable for permitting an article or carrier to travel along a main conveyer or to be switched therefrom to a branch conveyer.

A further object is to provide an automatically operable system wherein a branch conveyer is connected to a main conveyer and is adapted to receive articles or carriers traveling on the main conveyer when keyed for discharge to the branch conveyer.

A further object is to provide a system of the character referred to wherein articles or carriers are adapted normally to travel along the main conveyer, and wherein a branch conveyer is associated with the main conveyer and is provided with means operable for engaging the carrier and causing it to travel from the main conveyer to the branch conveyer.

A further object is to provide a switching conveyer system wherein a branch conveyer is connected to the main conveyer and provided with operating means for engaging an article or for causing it to be switched from the main conveyer to the branch conveyer, and to provide means operative by an article traveling to the branch conveyor for restoring the normal position of the operating means.

A further object is to provide a conveyer system of the character referred to wherein articles are adapted to be keyed or to otherwise have their destinations predetermined, and to provide means for preventing a carrier from entering the branch conveyor for which it is keyed when such branch conveyer is already carrying its maximum number of carriers and is not free to receive additional carriers.

Other objects and advantages of the invention will become apparent during the course of the following description.

In the drawings we have shown one embodiment of the invention. In this showing,

Figure 1 is a fragmentary plan view,

Figure 2 is a section on line 2—2 of Figure 1 showing a carrier in position on the main conveyer, Figure 3 is a section on line 3—3 of Figure 1, Figure 4 is a detail perspective view of the switch arm, Figure 5 is a plan view of one of the carriers, and, Figure 6 is a diagrammatic view of the electrical system for operating the apparatus.

Referring to Figure 1, the numeral 10 designates a main conveyer to which is connected a branch conveyer indicated as a whole by the numeral 11 and it will become apparent that any number of the branch conveyers may be connected to the main conveyer for receiving articles or carriers therefrom. The main conveyer comprises side rails 12 and 13 the latter of which obviously is cut away at the point where the branch conveyer 11 is connected to the main conveyer. The branch conveyer includes side rails 14 and 15, the latter of which forms a continuation of one of the sections of the rail 13 of the main conveyer. The apparatus is shown in the present instance as being a gravity conveyer, rollers 16 and 17 being journalled between the side rails of the main and branch conveyers. Additional smaller radial rollers 18 fill the space between the rollers 16 and 17 at the switch, and the rollers 18, as well as the rollers 16 at the switching point, have one end journalled in bearings 19.

A guide rail 20 is fixed in any suitable manner adjacent the curved section of the rail 15 substantially centrally thereof. The guide rail is preferably formed of angle iron, and is pivotally connected at one end as at 21 to a switch rail 22 of similar cross-sectional shape. The switch rail extends from its pivot point to a point opposite the main conveyer just ahead of the switching point as clearly shown in Figure 1. The switch rail is slidable on a support 23 carried by the adjacent rail 13. A depending arm 24 is carried by the switch rail and a spring 25 is connected between the arm 24 and the adjacent side rail of the conveyer to normally tend to move the switch rail 22 to the solid line position shown in Figure 1.

Referring to Figure 1, the numeral 26 designates a bracket carried by the curved portion of the rail 15 and pivotally supporting the lever 27 as at 28. This lever has a vertical portion 29 at one end arranged in the angle of the guide rail 20, as shown in Figures 1 and 3, for a purpose to be described. The other end of the lever 27 is pivotally connected as at 30 to a link 31, and the other end of this link is pivotally connected as at 32 to an arm 33 carried by the switch rail 22, as clearly shown in Figure 4. It will be apparent that movement of the end 29 of the lever away from the guide rail moves the link 31 and arm 33 inwardly, and thus swings the free end of the switch rail 22 outwardly away from the side rail 13.

A horizontal support 34 is carried by the side rail 13 as shown in Figure 3 and is braced with respect thereto by an angular brace 35. A vertically extending bracket 36 is secured at its lower end as at 37 to the support 34 and carries a solenoid 38 at its upper end having an armature 39 provided in its outer end with a slot 40. A small bracket 41 also is arranged on the support 34 and carries a stub shaft 42. This shaft, in turn, supports a bell crank lever indicated as a whole by the numeral 43 and including vertical and horizontal arms 44 and 45. The upper end of the arm 44 carries a pin 46 operating in the slot 40, while the free end of the arm 45 carries a latch 47 adapted to engage a depending lug 48 carried by the switch rail 22 to hold the latter in outer or retracted position, as shown in dotted lines in Figure 1. Outwardly of the shaft 42, the bell crank lever carries a counter-weight 49 tending to hold the bell crank lever in the normal position shown in Figure 3.

Articles or carriers traveling on the main conveyer in the direction of the arrow shown in Figure 1 are adapted to effect actuation of the switch rail 22 whereby the article or carrier will be switched to the branch conveyer 11. As a part of the control means for determining the destination of the articles or carriers, the rails 12 and 13 are provided with outstanding brackets 50 carrying standards 51 at their free ends, as shown in Figure 2. A transverse rod 52 is carried at its ends by the standards 51 as at 53, and switches 54 are slidably adjustable in the rod 52. Each switch 54 carries a depending switch arm 55 adapted to be actuated in a manner to be described.

An article carrier suitable for use with the apparatus has been illustrated in Figures 2 and 5. As shown, the carrier comprises a base 56 against the bottom of which is secured a relatively wide batten 57 having its side edges concave as at 58. Adjacent each corner, the base 56 is provided with depending rollers 59, preferably of the ball bearing type, and these rollers are adapted to engage the switch rail 22 and guide rail 20, as will be apparent.

Corner standards 60 are carried by the base 56 and horizontal supports 61 are connected between the standards 60 at the end of the carrier to support an article tray 62. The posts or standards 60 are also connected at their upper ends and at the ends of the carrier by transverse bars 63 having a plurality of spaced openings 64 therein adapted to selectively receive keys 65, which are operable in a manner to be described for determining the destination of the carrier.

Means is provided for preventing additional carriers from entering either of the switches 11 when the switch is loaded to capacity and the carriers are not moving. A roller 66 is arranged in the branch conveyer 11 and is carried by the upper end of a lever 67 pivoted intermediate its ends as at 68. The other end of the lever 67 is connected to a depending link 69, and a spring 70 constantly tends to pull the link 69 downwardly to maintain the roller 68 in the path of travel of carriers moving along the branch section 11 to be depressed by such carriers.

An electrical system for controlling the apparatus has been shown in Figure 6. Main feed wires 71 and 72 are connected to a suitable source of current. A branch wire 73 is connected between the wire 71 and one terminal of the solenoid 38, while a second wire 74 leads from the other terminal of the solenoid as illustrated, and the two overhead switch arms 55 are connected in the wire 74 and are adapted when simultaneously operated to close a circuit through the solenoid 38 by being brought into engagement with contacts 75.

The line wire 71 is connected to one terminal of the coil of a retarded or delayed action relay 75, the other terminal of the coil of the relay being connected to a wire 76. The relay is adapted to attract an armature 77 connected to the wire 74, and this armature normally engages a contact 78 connected to the line wire 72 by a wire 79. A switch 80 is adapted to control the relay and may be of the usual limit switch type, including an arm 81 pivoted intermediate its ends as at 82 and adapted to be actuated by a transverse arm 83. The arm 83 is connected to the link 69 to be actuated thereby. The switch arm 81 normally is in engagement with dead contacts 84, and is movable into engagement with live contacts 85 and 86 connected respectively to the wires 72 and 76.

The operation of the apparatus is as follows:

It will be noted that a continuous run along the main conveyer is provided for the articles or carriers, and the latter will move continuously along the main conveyer unless the switch mechanism is operated. In this connection, it is pointed out that the main conveyer may be continuous so that if a carrier is not discharged to a branch conveyer during its travel past the switching points, it will continue around to the starting point and thence again past the switching points. The purpose of this arrangement will become apparent.

The switching arrangement shown in Figure 1 may be duplicated any number of times according to the desired number of branch conveyers, as will be apparent. Assuming that an unkeyed carrier or a carrier not keyed for the switch in Figure 1 approaches the switching point, the switch arms 55 will not be actuated, and the carrier will travel straight along the main conveyer without being switched around the branch conveyer.

If a carrier approaches the switching point with keys 65 arranged in the openings 64 in positions corresponding with the switch arms 55, it will be apparent that these switch arms will be actuated by the keys. Referring to Figure 6, it will be apparent that this operation causes a circuit to be closed through the solenoid 38. Current travels from the line wire 71 through wire 73, solenoid 38, through the wire 74 and switches 55, thence through the armature 77 and wires 79 and 72, back to the source of current. Thus the solenoid will be energized to attract its armature 39, and the bell crank lever 43 will swing in a counter-clockwise direction to move the latch 47 downwardly and release the finger 48.

Under the conditions referred to, the spring 25 will swing the switch rail 22 to the solid line position shown in Figure 1, and as soon as the keys 65 pass the switch arms 55, these arms will return to normal position and break the circuit through the solenoid 38, and the counter-weight 49 will return the bell crank lever 43 to normal position ready to hold the switching rail in normal position when it is returned to such position in a manner to be described.

With the switching rail 22 in the position shown in Figure 1, it will be arranged within the path of travel of the rollers 59, and one of the rollers will be engaged by the vertical flange of the switching rail to deflect the carrier around the curve. Thus the carrier will be forced to move around the switching point to the branch conveyer, and when one of the rollers strikes the end 29 of the lever 27, this lever will be actuated to move the link 31 and arm 33 inwardly, and thus swing the switching rail outwardly to cause the latch 47 to engage the lug or finger 48 to again hold the switching rail in normal position.

As the carrier passes around the branch conveyer the batten 57 thereof will contact with the roller 66 and move it downwardly, thus transmitting movement to the switch arm 81 to cause it to bridge across the contacts 85 and 86. This action closes a circuit through the relay 75 which is retarded in its action so that it will not attract its armature 77 within the time required for a carrier to pass completely over the roller 66. If carriers accumulate in the branch 11 to the full capacity of the latter, it is obviously desirable to prevent the entrance into the switch of additional carriers, and it is under such conditions that the solenoid 75 functions.

Assuming that the branch 11 is full to capacity, the last carrier entering the branch will hold the roller 66 depressed. Under such conditions the switch arm 81 will remain in engagement with the contacts 85 and 86, and current will flow from line wire 71 through the relay 75 and wire 76, across the contacts 86 and 85 and thence back to the source through wire 72. The maintenance of this circuit for lengths of time greater than that required for the normal passage of a carrier over the roller 66 causes the energization of the relay 75 to attract the armature 77, and thus break the circuit between the armature 77 and contact 78. Since these elements are in series with the switches 55, subsequent closing of these switches by a properly keyed carrier will fail to actuate the solenoid 38, and the carrier will be prevented from being deflected to the branch conveyer. The carrier will then continue along the main conveyer, which is preferably continuous, as previously stated, and thus the carrier will travel completely around the main conveyer until it approaches the branch conveyer for which it is keyed. Assuming that carriers have again started to move along the branch conveyer, the carrier will then be discharged thereto. If the carriers have not started to move in the branch conveyer, the carrier merely will continue to travel around the main conveyer, as will be apparent.

As soon as the roller 66 is released, the spring 70 returns the roller and the switch arm 81 to normal position, thus breaking the circuit through the relay and permitting the armature 77 thereof to return to normal position. This operation takes place after the branch conveyer has been relieved of its capacity load by the movement of the carriers thereon, and thus normal conditions will be restored to permit approaching properly keyed carriers to actuate the solenoids 38 and associated elements upon the closing of the switches 55.

From the foregoing it will be apparent that the present apparatus is not only automatic in operation for determining the proper destination of articles or carriers, but it is also completely automatic for preventing the discharge of carriers to a full branch conveyer until such time as the branch conveyer is relieved of its capacity load by the movement of the carriers therealong.

The apparatus has been described as applied to a gravity conveyer, but it will be apparent that it is equally applicable to conveyers of other types, such as live roller conveyers. The system also has been described as comprising generally a main conveyer and one or more branch conveyers leading therefrom. It will be apparent however, that the invention is equally applicable to a main or supply conveyer from which articles or carriers are adapted to travel to either of a plurality of branch conveyers. In Figure 1 of the drawings, therefore, the portion of the branch conveyer approaching the switching point may be considered as the main or supply conveyer, while the succeeding portion of the main conveyer and the branch 11 may be considered as a pair of branch or receiving conveyers to one of which the articles or carriers normally travel from the supply conveyer.

It is to be understood that the form of the invention herewith shown and described is to be taken as a preferred example of the same and that various changes in the shape, size and arrangement of parts may be resorted to without departing from the spirit of the invention or the scope of the subjoined claims.

We claim:

1. A switching conveyer comprising a supply conveyer, a pair of receiving conveyers associated therewith to receive articles therefrom, conveyer means normally tending to transfer articles from the supply conveyer to one of said receiving conveyers, means movable partially into the path of travel of the article and engageable with a portion of the article to cause the article to be switched to the other receiving conveyer, said last named means having a normal bias to operative position to cause the article to be switched to the last named receiving conveyer, and means normally holding said last named means in inoperative position and releasable by an article on the supply conveyer.

2. A switching conveyer comprising a supply conveyer, a pair of receiving conveyers associated therewith to receive articles therefrom, said supply conveyer being connected to one of said receiving conveyers whereby articles normally travel from the former to the latter, means movable to an operative position partially in the path of travel of the article and engageable with a portion of an article on the supply conveyer to cause the article to be switched to the other receiving conveyer, said means having a normal bias to operative position, means normally holding said switching means in inoperative position, and means operative by an article of a certain class for releasing said last named means.

3. A switching conveyer comprising a supply conveyer, a pair of receiving conveyers associated therewith to receive articles therefrom, said supply conveyer being connected to one of said receiving conveyers whereby articles normally travel from the former to the latter, a switch arm having a normal bias to an operative position partially in the path of travel of the article and engageable with a portion of an article on the supply conveyer to cause the article to be switched to the other receiving conveyer, a latch normally holding said switch arm in inoperative position, and means operative by an article of a certain class for releasing said latch.

4. A switching conveyer comprising a supply conveyer, a pair of receiving conveyers associated therewith to receive articles therefrom, said supply conveyer being connected to one of said receiving conveyers whereby articles normally travel from the former to the latter, switching means having a normal bias to operative position to engage an article on the supply conveyer and switch it to the other receiving conveyer, means normally holding said switching means in inoperative position and releasable to permit it to move to operative position, and means operative by an article moving along the second named receiving conveyer for restoring said switching means to normal position.

5. A switching conveyer comprising a supply conveyer, a pair of receiving conveyers associated therewith to receive articles therefrom, said supply conveyer being connected to one of said receiving conveyers whereby articles normally travel from the former to the latter, switching means having a normal bias to operative position to engage an article and switch it to the other receiving conveyer, a latch normally holding said switching means in inoperative position, means operative by an article of a certain class for releasing said latch, and means operative by an article moving along the second named receiving conveyer for restoring said switching means to normal position.

6. A switching conveyer comprising a supply conveyer, a pair of receiving conveyers associated therewith to receive articles therefrom, said supply conveyer being connected to one of said receiving conveyers whereby articles normally travel from the former to the latter, a switch arm having a normal bias to an operative position in the path of travel of a portion of an article on the supply conveyer and engageable therewith to cause the article to be switched to the other receiving conveyer, a latch normally holding said switch arm in inoperative position, means operative by an article of a certain class for releasing said latch, and means operative by an article moving along the second named receiving conveyer for restoring the switch arm to normal position.

7. Apparatus constructed in accordance with claim 6 wherein the means operative by an article of a certain class for releasing said latch comprises a solenoid connected to the latch and adapted to release the latter when energized, and a circuit for said solenoid including at least one switch adapted to be closed by an article of said class.

8. Apparatus constructed in accordance with claim 6 wherein the means for restoring the switch arm to normal position comprises a lever pivoted intermediate its ends and having one end arranged in the path of travel of a portion of an article moving along the second named receiving conveyer, an operating arm carried by said switch arm, and a link connected between said operating arm and the other end of said lever.

9. A switching conveyer comprising a supply conveyer, a pair of receiving conveyers associated therewith to receive articles therefrom, said supply conveyer being connected to one of said receiving conveyers whereby articles normally travel from the former to the latter, a switch arm pivoted at one end and having its other end normally biased to an operative position in the path of travel of a portion of an article on the supply conveyer and engageable therewith to cause the article to be switched to the other receiving conveyer, a latch normally holding said switch in operative position, a solenoid connected to the latch and adapted to release the latter when energized, a circuit for said solenoid including at least one switch adapted to be closed by an article of a certain class, a lever having one end arranged in the path of travel of an article moving along the second named receiving conveyer to be actuated thereby, and means connecting said switch arm to said lever whereby actuation of the latter will restore said switch arm to normal position.

10. A switching conveyer comprising a supply conveyer, a pair of receiving conveyers associated therewith to receive article carriers therefrom, said supply conveyer being connected to one of said receiving conveyers whereby article carriers normally travel from the former to the latter, an article carrier adapted to travel on said supply and receiving conveyers, a depending roller carried by said article carrier, a switch arm having a normal bias to an operative position in the path of travel of said roller and engageable therewith to cause the article carrier to be switched to the other receiving conveyer, and a releasable latch normally holding said switch arm in inoperative position.

11. Apparatus constructed in accordance with claim 10 provided with means arranged in the path of travel of the roller of a carrier moving along said second named receiving conveyer and adapted to be actuated thereby for restoring said switch arm to normal position.

12. A switching conveyer comprising a supply conveyer, a pair of receiving conveyers associated therewith to receive articles therefrom, said supply conveyer being connected to one of said receiving conveyers whereby articles normally travel from the former to the latter, means having a normal bias to operative position for engaging and switching an article to the other receiving conveyer, a latch normally holding said last named means in inoperative position, means operative by an article of a certain class for releasing said latch, and means operative by an article at rest in the second named receiving conveyer adjacent its junction with the supply conveyer for preventing operation of said latch releasing means.

13. A switching conveyer comprising a supply conveyer, a pair of receiving conveyers associated therewith to receive articles therefrom, said supply conveyer being connected to one of said receiving conveyers whereby articles normally travel from the former to the latter, means having a normal bias to operative position for engaging and switching an article to the other receiving conveyer, a latch normally holding said last named means in inoperative position, a solenoid adapted when energized to release said latch, a circuit for said solenoid including at least one switch operative by an article of a certain class to close said circuit, and means operative by an article at rest in the second named receiving conveyer adjacent its junction with the supply conveyer for preventing operation of said latch.

14. Apparatus constructed in accordance with claim 13, wherein said last named means comprises a contact and an armature normally in engagement therewith and forming a part of said circuit, a second circuit, a retarded relay in said second circuit adapted when energized for a predetermined length of time to attract said armature and open said first named circuit, and a switch in the second named receiving conveyer operable by articles passing thereover and adapted to be held in closed position by an article at rest adjacent the junction of the second named receiving conveyer with the supply conveyer.

HENRY R. GOTTHARDT.
WILLIAM E. CAIN.